(12) United States Patent
Jain et al.

(10) Patent No.: US 12,542,178 B2
(45) Date of Patent: Feb. 3, 2026

(54) MEMORY STRUCTURE INCLUDING A LOW CELL SUPPLY VOLTAGE PROGRAMMING CIRCUIT

(71) Applicant: GlobalFoundries U.S. Inc., Malta, NY (US)

(72) Inventors: Navneet K. Jain, Milpitas, CA (US); Mahbub Rashed, Cupertino, CA (US)

(73) Assignee: GlobalFoundries U.S. Inc., Malta, NY (US)

( * ) Notice: Subject to any disclaimer, the term of this patent is extended or adjusted under 35 U.S.C. 154(b) by 121 days.

(21) Appl. No.: 18/509,519

(22) Filed: Nov. 15, 2023

(65) Prior Publication Data

US 2025/0157529 A1    May 15, 2025

(51) Int. Cl.
    *G11C 11/419*     (2006.01)
(52) U.S. Cl.
    CPC .................. *G11C 11/419* (2013.01)
(58) Field of Classification Search
    CPC ..................................................... G11C 11/419
    USPC ......................................................... 365/154
    See application file for complete search history.

(56) References Cited

U.S. PATENT DOCUMENTS

| | | | |
|---|---|---|---|
| 6,946,901 B2* | 9/2005 | Kang ................ | H03K 19/0016 |
| | | | 327/544 |
| 7,692,964 B1 | 4/2010 | Sabharwal et al. | |
| 8,406,039 B2* | 3/2013 | Lee ..................... | H10B 10/12 |
| | | | 365/63 |
| 2008/0019205 A1* | 1/2008 | Yamaoka ............. | G11C 11/419 |
| | | | 365/226 |
| 2011/0090753 A1* | 4/2011 | Lee ..................... | G11C 11/413 |
| | | | 365/226 |
| 2014/0036609 A1 | 2/2014 | Sridhara | |
| 2015/0170736 A1* | 6/2015 | Gulati ................. | G11C 11/417 |
| | | | 365/154 |

(Continued)

FOREIGN PATENT DOCUMENTS

JP     2008287768 A1     11/2008

OTHER PUBLICATIONS

European Search Report for corresponding EP Application No. 24175901.8-1211 dated Oct. 28, 2024, GF2023087-EP-EPA, 9 pages.

(Continued)

*Primary Examiner* — Sung Il Cho
(74) *Attorney, Agent, or Firm* — David Cain; Hoffman Warnick LLC (57) ABSTRACT

A disclosed memory structure includes memory cells connected to first and second cell supply voltage lines. A programming circuit enables programming of a low cell supply voltage (Vcsl) on the first cell supply voltage line and includes transistors with different threshold voltages connected to ground and further connectable, via switches, to the first cell supply voltage line. The programming circuit can further include an additional switch connected between ground and the first cell supply voltage line. In an operational mode, the first cell supply voltage line is discharged to ground via the additional switch. In the retention mode, one of the transistors of the programming circuit is connected by a corresponding switch to the first cell supply voltage line for programming of Vcsl. Optionally, the memory structure can be implemented in FDSOI and the transistors of the programming circuit can also be back biased for fine tuning of Vcsl.

18 Claims, 8 Drawing Sheets

(56) References Cited

U.S. PATENT DOCUMENTS

2018/0211702 A1* 7/2018 Hanson ................. G11C 11/412
2020/0328746 A1 10/2020 Park et al.

OTHER PUBLICATIONS

Kumar et al., "A 0.6V Retention VMIN Ultra-Low Leakage High Density 6T SRAM in 40nm CMOS Technology using Adaptive Source Bias," 2018 31th International Conference on VLSI Design and 2018 17th International Conference on Embedded Systems, downloaded Oct. 24, 2023 from IEEE Xplore, 5 pages.

* cited by examiner

| Vb | Vcsl_SLVT NFET 401 | Vcsl_LVT NFET 402 | Vcsl_RVT PFET 403 | Vcsl_HVT PFET 404 |
|---|---|---|---|---|
| 0 | 0.02289 | 0.10610 | 0.09525 | 0.19110 |
| 0.25 | 0.01356 | 0.08698 | 0.11050 | 0.20720 |
| 0.5 | 0.00764 | 0.06872 | 0.12520 | 0.22270 |
| 0.75 | 0.00418 | 0.05182 | 0.13970 | 0.23760 |
| 1 | 0.00225 | 0.03697 | 0.15380 | 0.25210 |
| 1.25 | 0.00120 | 0.02487 | 0.16760 | 0.26630 |
| 1.5 | 0.00064 | 0.01582 | 0.18110 | 0.28010 |
| 1.75 | 0.00035 | 0.00963 | 0.19450 | 0.29370 |

MEMORY STRUCTURE INCLUDING A LOW CELL SUPPLY VOLTAGE PROGRAMMING CIRCUIT

BACKGROUND

The present disclosure relates to static random access memory (SRAM) structures and, more particularly, to embodiments of an SRAM structure with a retention mode power control circuit.

SRAM structures have various modes of operation including, but not limited to, an operational mode (also referred to herein as a functional mode) during which read and write operations are performed and a retention mode during which previously stored data is retained. In a typical SRAM structure, SRAM cells are each connected to a pair of cell supply voltage lines including one that is set at a positive cell supply voltage (Vcs) and another one that is connected to ground (Vss). The difference between Vcs and Vss is relatively large in order to facilitate robust read and write operations. However, this large difference between Vcs and Vss can be associated with significant leakage current during the retention mode.

SUMMARY

Disclosed herein are embodiments of a memory structure. The memory structure can include an array of memory cells. The memory structure can further include a first cell supply voltage line, which is connected to the memory cells. The first cell supply voltage line can be at a first cell supply voltage, which is equal to or higher than ground (i.e., than a ground voltage). The memory structure can further include a programming circuit. The programming circuit can include multiple transistors with different threshold voltages. These transistors can be connected to ground and are further connectable by switches, respectively, to the first cell supply voltage line.

In some embodiments, the memory structure can include an array of memory cells. The memory structure can further include a first cell supply voltage line, which is connected to the memory cells. The first cell supply voltage line can be at a first cell supply voltage, which is equal to or higher than ground. The memory structure can further include a programming circuit. The programming circuit can include multiple transistors with different threshold voltages. These transistors can be connected to ground and further connectable by switches, respectively, to the first cell supply voltage line. The memory structure can further be a semiconductor-on-insulator structure. In this case, the memory structure can further include a semiconductor substrate, a well region in the semiconductor substrate and connected to receive a bias voltage, and an insulator layer on the semiconductor substrate over the well region. The transistors can be on the insulator layer and aligned above the well region.

In some embodiments, the memory structure can include an array of memory cells. The memory structure can further include a first cell supply voltage line, which is connected to the memory cells. The first cell supply voltage line can be at a first cell supply voltage, which is equal to or higher than ground. The memory structure can further include a programming circuit. The programming circuit can include multiple transistors with different threshold voltages. These transistors can be connected to ground and further connectable by switches, respectively, to the first cell supply voltage line. The memory structure can further be a semiconductor-on-insulator structure. In this case, the memory structure can further include a semiconductor substrate, a first Nwell in the semiconductor substrate and connected to receive a first bias voltage, a second Nwell in the semiconductor substrate and isolated from the first Nwell and an insulator layer on the semiconductor substrate over the first Nwell and the $2^{nd}$ Nwell. The transistors can be on the insulator layer and can include at least: two N-channel field effect transistors aligned above the first Nwell and two P-channel field effect transistors aligned above the second Nwell in the semiconductor substrate.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

As mentioned above, in a typical SRAM structure, SRAM cells are each connected to a pair of cell supply voltage lines including one that is set at a positive cell supply voltage (Vcs) and another one that is connected to ground (Vss). The difference between Vcs and Vss is relatively large in order to facilitate robust read and write operations. However, this large difference between Vcs and Vss can be associated with significant leakage current during the retention mode.

In view of the foregoing, disclosed herein are embodiments of a memory structure (e.g., a static random access memory (SRAM) structure) including memory cells (e.g., SRAM cells), which are each connected to a pair of cell supply voltage lines: a first cell supply voltage line at a programmable first cell supply voltage (also referred to herein as a programmable low cell supply voltage (Vcsl)) and a second cell supply voltage line at a second cell supply voltage (also referred to herein as a high cell supply voltage (Vcsh)). The memory structure can further include a programming circuit, which is configured to enable programming of Vcsl. Programming of Vcsl can be performed: (1) so that, in an operational mode (also referred to herein as a functional mode, Vcsl is at ground (Vss) and significantly lower than Vcsh for robust operation (i.e., Vss=Vcsl<Vcsh); and (2) so that, in a retention mode, Vcsl is selectable from a range of possible voltages (e.g., Vss≤Vcsl<Vcsh) for reduced leakage current. The programming circuit can include multiple transistors with different threshold voltages (VTs). The transistors are connected to ground (Vss) (e.g., at 0.0V) and are further connected, via individually selectable switches, to the first cell supply voltage line. The programming circuit can further include an additional switch connected between ground and the first cell supply voltage line. A controller can output corresponding enable signals to the switches and to the additional switch so that, in the operational mode, the Vcsl is discharged to ground and so that, in the retention mode, one of the transistors is selectively connected by one of the switches to the first cell supply voltage line. Depending upon the VT of the transistor connected to the first cell supply voltage line, Vcsl will be programmed to some desired level sufficient to ensure that data is retained while also reducing leakage current. In some embodiments, the memory structure can be implemented in a fully depleted semiconductor-on-insulator technology processing platform (e.g., a fully depleted silicon-on-insulator (FDSOI) technology processing platform) so that back biasing of the transistors in the programming circuit can also be performed in the retention mode. Depending upon the specific bias voltage used for back biasing (e.g., as selected via a controller from a range of possible back bias voltages) Vcsl can be further fine-tuned, as discussed in greater detail below.

Figure 1A:
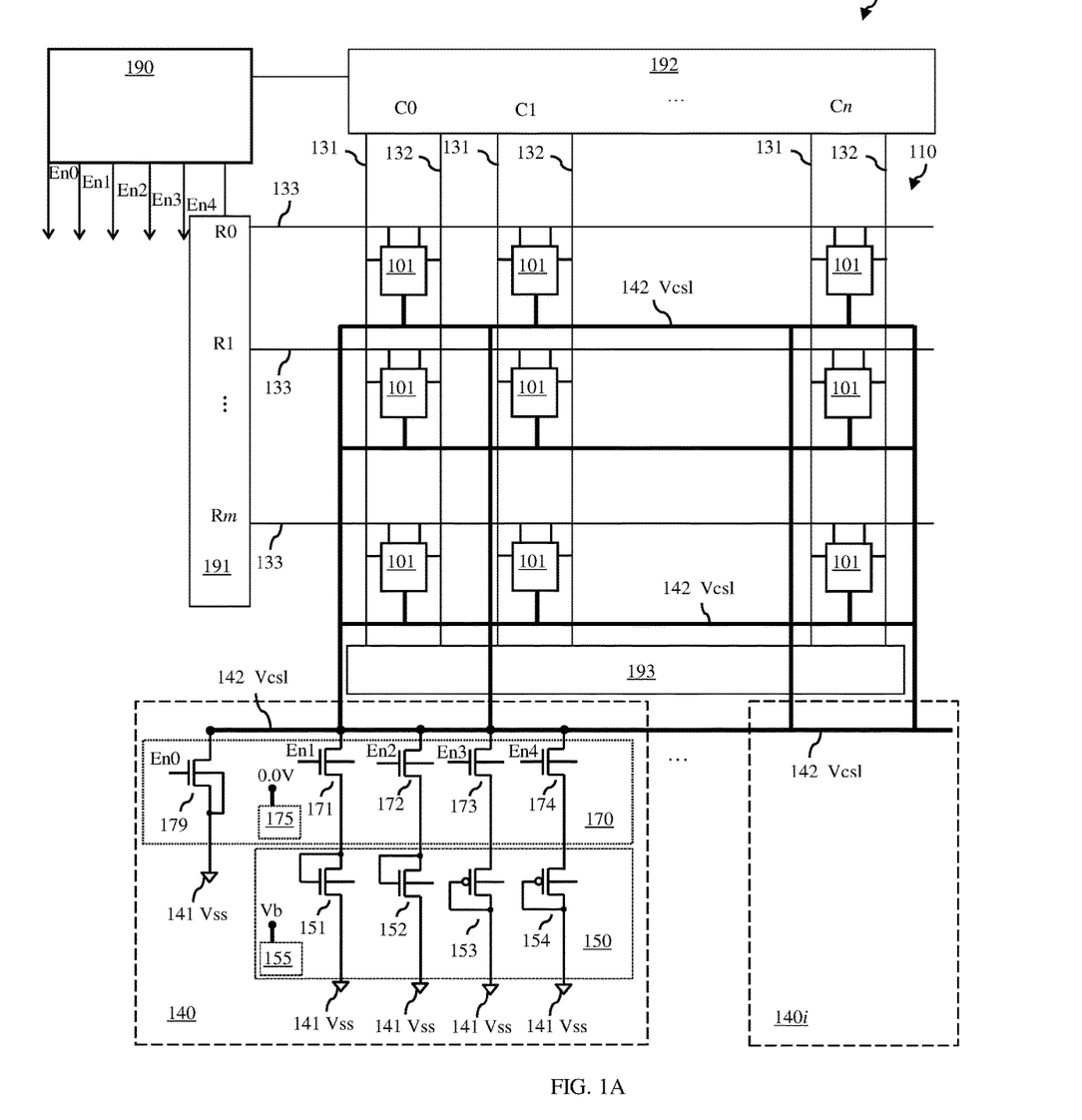
FIG. 1A is a schematic diagram illustrating disclosed memory structure embodiments.
Figure 1B:
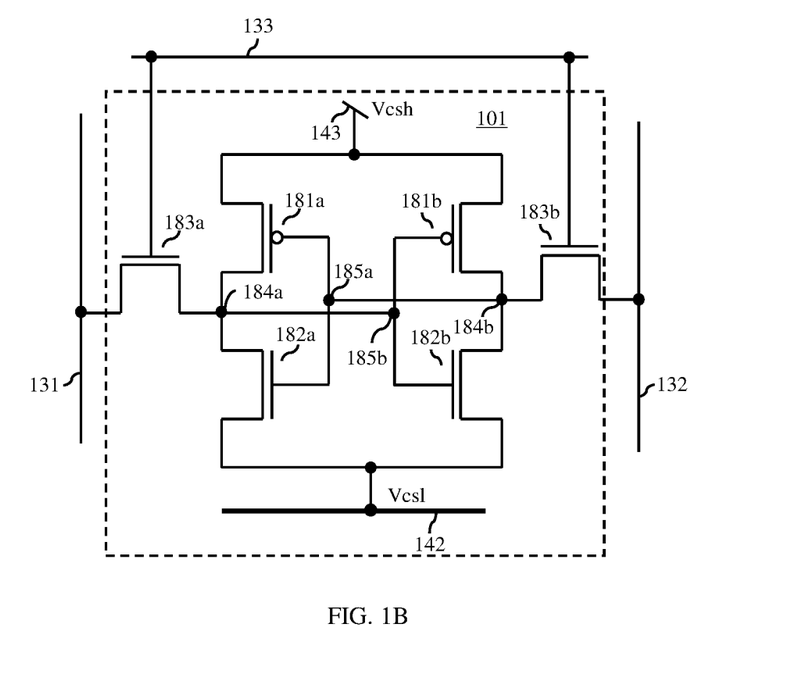
FIG. 1B is a schematic diagram illustrating an example of a memory cell that can be incorporated into the structure of FIG. 1A.

FIG. 1A is a schematic diagram illustrating an embodiment of a memory structure 100 (e.g., a static random access memory (SRAM) structure). FIG. 1B is a schematic diagram illustrating an example of a memory cell 101 (e.g., an SRAM cell) that can be incorporated into the memory structure 100 of FIG. 1A. Referring to FIGS. 1A and 1B in combination, memory structure 100 can include an array 110 of memory cells 101 arranged in columns ($C_0$-Cn) and rows ($R_0$-Rx). All memory cells 101 within the same row ($R_0$-$R_x$) can be electrically connected to the same wordline 133 for the row. All memory cells 101 within the same column ($C_0$-$C_y$) can be electrically connected to the same pair of bitlines (131 and 132) for that column. Furthermore, memory cells 101 can be connected to a first cell supply voltage line 142 set at a first cell supply voltage (also referred to herein as a low cell supply voltage (Vcsl), which as discussed below is programmable). All memory cells 101 are also connected to a second cell supply voltage line 143 at a second cell supply voltage (also referred to herein as a high cell supply voltage (Vcsh)) that is at a higher voltage level than the Vcsl. To avoid clutter in FIG. 1A connection of memory cells 101 to second cell supply voltage line 143 is not shown; however, this connection is illustrated in FIG. 1B and discussed below.

Each memory cell 101 can be, for example, a six-transistor (6T) SRAM cell. A 6T SRAM cell can include a pair of cross-coupled inverters. Each inverter can include a pull-down transistor 182a, 182b (e.g., another NFET) and a pull-up transistor 181a, 181b (e.g., a P-channel field effect transistor (PFET)) connected in series between first cell supply voltage line 142 and second cell supply voltage line 143. A common gate node 185a, which is connected to the gates of pull-up transistor 181a and pull-down transistor 182a, can be connected to a storage node 184b at a junction between pull-up transistor 181b and pull-down transistor 182b. A common gate node 185b, which is connected to the gates of pull-up transistor 181b and pull-down transistor 182b, can be connected to a storage node 184a at a junction between pull-up transistor 181a and pull-down transistor 182a. The 6T SRAM cell can further include a pair of access transistors 183a, 183b (also referred to herein as pass-gate transistors). Access transistors 183a, 183b can be N-channel field effect transistors (NFETs)). The drain of access transistor 183a can be connected to storage node 184a and the drain of access transistor 183b can be connected to storage node 184b. Furthermore, the source of access transistor 183a can be connected to one bitline of a complementary pair of bitlines for a column (e.g., bitline 131, which is also referred to as a true bitline (BLT)) and the source of access transistor 183b can be connected to the other bitline in the complementary pair (e.g., bitline 132, also referred to as the complementary bitline (BLC)). The gates of access transistors 183a, 183b can be connected to a wordline (WL) 133 for a row. The above description of a 6T SRAM cell is offered for illustration purposes only and is not intended to be limiting. It should be understood that a 6T SRAM cell with an alternative configuration, another type of SRAM cell (e.g., a five-transistor SRAM cell, an eight-transistor SRAM cell, etc.) or any another type of memory cell that requires both low and high cell supply voltages could alternatively be incorporated into memory structure 100 as memory cells 101.

Memory structure 100 can further include a controller 190. Memory structure 100 can also include peripheral circuitry in communication with the controller 190 and further connected to the array of memory cells 101 to facilitate operations (i.e., read and write operations) and to provide data retention in response to control signals from the controller 190. The peripheral circuitry can be powered by a positive supply voltage (Vdd), which is either equal to Vcsh or at a different positive voltage level than Vcsh. The peripheral circuitry can include, for example, a row decoder 191 electrically connected to wordlines 133 for the rows. Row decoder 191 can include, for example, wordline drivers for selectively controlling wordline (WL) signals on the wordlines, respectively, during read and write operations. The peripheral circuitry can also include, for example, a column decoder 192 electrically connected to the complementary pairs of bitlines 131 and 132 for the columns. Column decoder 192 can include, for example, bitline drivers for controlling bitline biasing (e.g., during read and write operations). The peripheral circuitry can also include a sense circuit 193 electrically connected to the complementary pairs of bitlines 131 and 132 for the columns and configured to enable sensing of stored data values.

For example, if a data value of "1" (i.e., a high data value) is to be written to storage node 184a of a given memory cell, a high voltage level is applied to bitline 131 and bitline 132 is discharged to ground. Then, wordline 133 is pulsed high to turn on the access transistors 183a, 183b and the data value "1" is stored in storage node 184a. Contrarily, if a data value of "0" (i.e., a low data value) is to be written to storage node 184a, bitline 131 is discharged to ground and a high voltage level is applied to bitline 132. Then, wordline 133 is pulsed high to turn on access transistors 183a, 183b and the data value "0" is stored in the storage node 184a. In a read operation, the data value stored in the memory cell is read out. Specifically, bitlines 131 and 132 are pre-charged to a high volage level and wordline 133 is again pulsed high to turn on access transistors 183a, 183b. When a data value of "1" is stored on storage node 184a, bitline 131 will remain charged at its pre-charge level of "1" and bitline 132 will be discharged to "0" through transistors 182b and 183b. When a data value of "0" is stored on storage node 184a, bitline 131 will be discharged to "0" through transistors 182a and 183a and bitline 132 will remain charged at its pre-charge level of "1". A sense amplifier of sense circuit 193 can sense the voltage differential (or current differential) between bitlines 131 and 132 and thereby can sense the stored data value.

Peripheral circuitry, which is controlled by a controller 190 and which is configured to facilitate read and write operations as described above, is well known in the art. Therefore, the details thereof have been omitted from this specification in order to allow the reader to focus on the salient aspects of the disclosed embodiments related to switching between an operational mode (during which the read and write operations are performed) and a retention mode and further related to programming of Vcsl on first cell supply voltage line 142 using a novel programming circuit 140. As discussed in greater detail below, in response to control signals from controller 190, programming circuit 140 can program Vcsl so that, in the operational mode (also referred to herein as the functional mode), Vcsl is at ground (Vss) and significantly lower than Vcsh for robust operation (i.e., Vss=Vcsl<Vcsh) and so that, in the retention mode, Vcsl is selectable from a range of possible voltages (e.g., Vss≤Vcsl<Vcsh) for reduced leakage current and, particular, to prevent leakage current over some predetermined amount.

More specifically, as illustrated in FIG. 1A, first cell supply voltage line 142 can be, for example, in the form of a wire grid including: first wires electrically connected to all memory cells 101 in the rows, respectively; one or more second wire electrically connected to all first wires; and at least one third wire electrically connected to the second wire(s) and thereby the first wire(s). Memory structure 100 can further include at least one instance of a programming circuit 140 in communication with controller 190 and electrically connected to first cell supply voltage line 142.

Programming circuit 140 can include multiple transistors having different threshold voltages (VTs) (e.g., see transistors 151-154). That is, the transistors can be different VT-type transistors. For example, the transistors can include any two or more of the following: a super low threshold voltage (SLVT) transistor (alternatively referred to as an ultra-low threshold voltage (ULVT) transistor); a low threshold voltage (LVT) transistor; a regular threshold voltage (RVT) transistor (alternatively referred to as a standard threshold voltage (SVT) transistor); a high threshold voltage (HVT) transistor; a super high threshold voltage (SHVT) transistor (alternatively referred to as an ultra-high threshold voltage (UHVT) transistor); or any transistor with a different threshold voltage than the other(s). The transistors can be field effect transistors (FETs) and can include any of N-channel field effect transistor(s) (NFET(s)) and/or P-type field effect transistor(s) (PFET(s)).

Programming circuit 140 can, for example, include four transistors 151-154 with different VTs. These four transistors can include a first transistor 151 with a first VT and a second transistor 152 with a second VT that is higher than the first VT. For example, first transistor 151 and second transistor 152 can both be NFETs with first transistor 151 being a SLVT NFET and second transistor 152 being a LVT NFET. These four transistors 151-154 can further include a third transistor 153 with a third VT and a fourth transistor 154 with a fourth VT higher than the third VT. For example, third transistor 153 and fourth transistor 154 can both be PFETs with third transistor 153 being an RVT PFET and fourth transistor 154 being a HVT PFET.

Transistors 151-154 can each have a first source/drain region electrically connected to ground 141 (e.g., at 0.0V) and a second source/drain region connectable by a corresponding switch 171-174 to first cell supply voltage line 142. Specifically, switches 171-174 are individually selectable for electrically connecting transistors 151-154, respectively, to first cell supply voltage line 142. Additionally, gates of transistors 151-154 can be electrically connected to the drain regions thereof. For example, as illustrated in FIG. 1A, NFET 151 can have a source region, which is electrically connected to ground 141, and a drain region, which is electrically connected to its primary gate and which is further selectively connectable by switch 171 to first cell supply voltage line 142. NFET 152 can have a source region, which is electrically connected to ground 141, and a drain region, which is electrically connected to its primary gate and which is further selectively connectable by switch 172 to first cell supply voltage line 142. PFET 153 can have a drain region, which is electrically connected to ground 141 and to its primary gate, and a source region, which is selectively connectable by switch 173 to first cell supply voltage line 142. PFET 154 can have a drain region, which is electrically connected to ground 141 and to its primary gate, and a source region, which is selectively connectable by switch 174 to first cell supply voltage line 142.

Switches 171-174 are electrically connected at one terminal to transistors 151-154, respectively, and at an opposite terminal to first cell supply voltage line 142. Switches 171-174 can be selectively and individually controllable by corresponding enable signals (e.g., see En1-En4) received from controller 190 to electrically connect any given transistor to first cell supply voltage line 142. Switches 171-174 can, for example, be NFET switches. NFET switches 171-174 can include source regions connected to transistors 151-154, drain regions connected to first cell supply voltage line 142, and gates connected to receive corresponding enable signals En1-En4. En1-En4 control the on/off states of the NFET switches. Thus, for a given transistor-NFET switch pair, when the corresponding enable signal is high, the NFET switch will be conductive electrically connecting the transistor to first cell supply voltage line 142 and, when the corresponding enable signal is low, the NFET switch will be non-conductive. As discussed in greater detail below, Vcsl on first cell supply voltage line 142 will vary at least as a function of which one of transistors 151-154 (which have different VTs) is electrically connected to first cell supply voltage line 142.

Programming circuit 140 can further include an additional switch 179 (also referred to herein as a mode control switch). Additional switch 179 can be electrically connected between ground (Vss) 141 and first cell supply voltage line 142 and the on/off state of additional switch 179 can be controllable by an additional enable signal (En0) (also referred to herein as a mode control signal) received from controller 190. Additional switch 179 can, for example, be an additional NFET switch with a source region electrically connected to ground 141, with a drain region electrically connected to first cell supply voltage line 142, and with a gate connected to receive En0. Thus, when En0 is high, additional switch 179 will be conductive thereby discharging first cell supply voltage line 142 to ground (i.e., Vcsl will be at ground); whereas, when En0 is low, additional switch 179 will be non-conductive.

During the operational mode (e.g., during read or write operations), controller 190 can output switch enable signals (En1-En4) and mode control signal (En0) such that, within programming circuit 140, switches 171-174 remain off and additional switch 179 turns on. Thus, in embodiments where switches 171-174 and additional switch 179 are all NFET switches, En1-En4 can all be at low voltage levels during the operational mode so switches 171-174 are off and En0 will be high so that additional switch 179 is on and Vcsl is pulled to ground. As a result, the maximum difference between Vcsl and Vcsh can be achieved for robust read and write operations.

During the retention mode, controller 190 can output switch enable signals (En1-En4) and mode control signal (En0) such that, within programming circuit 140, additional switch 179 is off and only a particular one of switches 171-174 turns on. For example, in embodiments where switches 171-174 and additional switch 179 are all NFET switches, En0 and all but one of En1-E4 can be low during the retention mode and a selected one of En1-En4 will go high, thereby connecting only one of transistors 151-154 to first cell supply voltage and setting Vcsl at a desired level (i.e., programming Vcsl to the desired level). As a result, a maximum desired difference between Vcsl and Vcsh can be achieved that is sufficient to ensure that data is retained during the retention mode but that is smaller than the difference between Vcsl and Vcsh in the operational mode in order to reduce leakage current and, more particularly, to prevent leakage current over some predetermined amount.

With the above-described configuration for programming circuit 140, the minimum number of different programmable Vcsl values available is equal to the number of transistors with different VTs. A memory structure 100 with such a programming circuit 140 can be implemented using any technology processing platform that allows for the formation of transistors with different VTs on the same chip.

Figure 2:
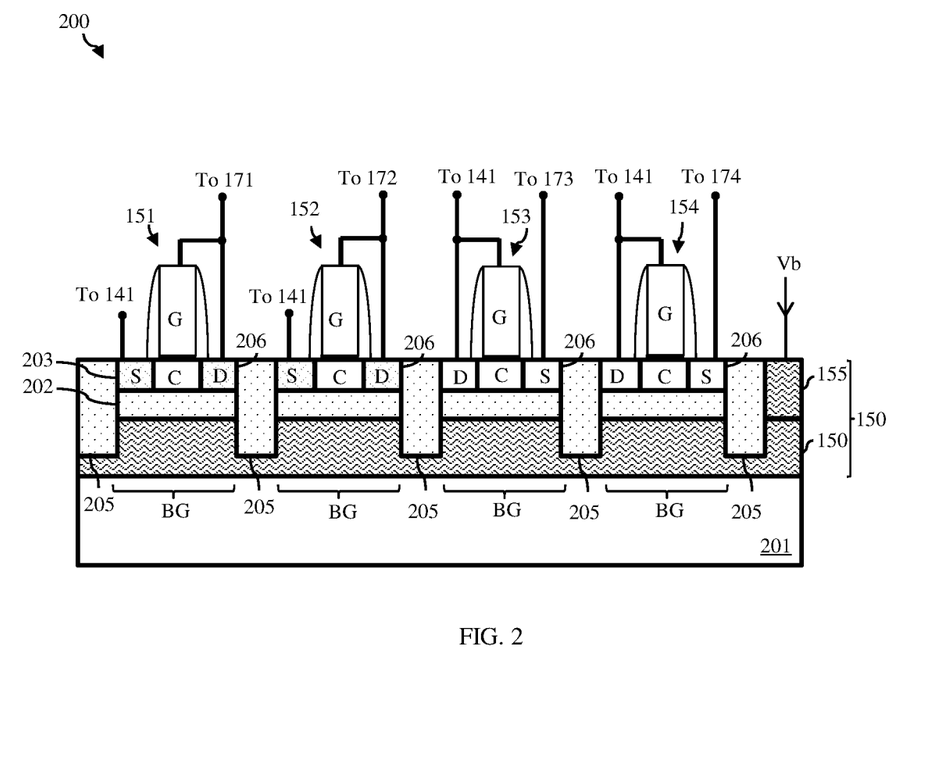
FIG. 2 is a cross-section diagram illustrating a portion of a semiconductor-on-insulator structure including examples of transistors with different threshold voltages that can be incorporated into the programming circuit of the structure of FIGS. 1A-1B.

Optionally, programming circuit 140 can be implemented using a fully depleted semiconductor-on-insulator technology processing platform (e.g., fully depleted silicon-on-insulator (FDSOI) technology processing platform). For example, FIG. 2 shows a cross-section diagram of a portion of a fully depleted semiconductor-on-insulator structure 200 (e.g., an FDSOI structure) including transistors 151-154 of programming circuit 140 of memory structure 100 of FIGS. 1A-1B. Structure 200 can include a semiconductor substrate 201. Semiconductor substrate 201 can be, for example, a monocrystalline silicon substrate or a substrate of any other suitable monocrystalline semiconductor material (e.g., silicon germanium, etc.). Structure 200 can further include a semiconductor-on-insulator region (e.g., an SOI region). Semiconductor-on-insulator region can include an insulator layer 202 on semiconductor substrate 201. Insulator layer 202 can be, for example, a thin silicon dioxide layer or a relatively thin layer of any other suitable insulator material. The semiconductor-on-insulator region can further include a thin semiconductor layer 203 on insulator layer 202. Semiconductor layer 203 can be, for example, a monocrystalline silicon layer or a layer of any other suitable monocrystalline semiconductor material (e.g., silicon germanium, etc.).

Transistors 151-154 can each include an active device region 206 in a corresponding portion of semiconductor layer 203. The boundaries of the corresponding portions of semiconductor layer 203 (and thereby the boundaries of the active device regions) can be defined by isolation regions 205. Isolation regions 205 can be, for example, shallow trench isolation (STI) regions. That is, trenches can extend from the top surface of semiconductor layer 203 to and optionally through insulator layer 202, can laterally surround the active device regions of the transistors, and can be filled with one or more layers of isolation materials (e.g., silicon dioxide, silicon nitride, silicon oxynitride, etc.).

Each transistor 151-154 can further include, within its active device region 206, a channel region (C) positioned laterally between source(S) and drain (D) regions. As mentioned above, first and second transistors 151-152 can be NFETs. Thus, first and second transistors 151-152 can each have source/drain regions with N-type conductivity at a relatively high conductivity level (e.g., N+ source/drain regions) and a channel region that is either intrinsic (i.e., undoped) or has P-type conductivity at a relatively low conductivity level (e.g., a P-channel region). Also, as mentioned above, third and fourth transistors 153-154 can be PFETs. Thus, third and fourth transistors 153-154 can each have source/drain regions with P-type conductivity at a relatively high conductivity level (e.g., P+ source/drain regions) and a channel region that is either intrinsic (i.e., undoped) or has N-type conductivity at a relatively low conductivity level (e.g., a N-channel region).

Each transistor 151-154 can further include a primary gate (G) (also referred to herein as a front gate) adjacent to (e.g., above, and immediately adjacent to) the active device region at the channel region. Those skilled in the art will recognize that, in a field effect transistor (FET), a gate (also referred to as a gate structure) can include a gate dielectric layer (including one or more layers of gate dielectric material) immediately adjacent to the channel region and a gate conductor layer (including one or more layers of gate conductor material) on the gate dielectric layer. In each transistor, the primary gate can include at least a relatively thin gate dielectric layer immediately adjacent to the top surface of semiconductor layer 203 at the channel region and a gate conductor layer on the gate dielectric layer. The primary gates could be any of gate-first polysilicon gate structures, gate-first high-K metal gate (HKMG) structures, gate-last HKMG structures (also referred to as a replacement metal gate (RMG) structure), or any other suitable type of gate structures. Optionally, the primary gates of the P-type transistors can include different gate materials than the primary gates of the N-type transistors and, thus, can have different work functions. Gate sidewall spacers can further be positioned laterally adjacent to sidewalls of the primary gates (e.g., to electrically isolate the gate structure from adjacent S/D regions). Such gate structures are well known in the art and, thus, the details thereof have been omitted from the specification in order to allow the reader to focus on the salient aspects of the disclosed embodiments. The primary gates of each transistor 151-154 can be tied to their respective drain regions.

Structure 200 can further include a well region 150 within and at the top surface of semiconductor substrate 201 immediately adjacent insulator layer 202. Well region 150 can be aligned below all transistors 151-154 of the programming circuit 140. For purposes of this disclosure, a well region refers to a region of semiconductor material doped (e.g., via a dopant implantation process or any other suitable doping process) so as to have a particular conductivity type. Well region 150 can be doped so as to have N-type conductivity. That is, well region 150 can be an Nwell. Those skilled in the art will recognize that one advantage of fully depleted semiconductor-on-insulator (e.g., FDSOI) technology processing platforms is that NFETs and PFETs can be formed on an insulator layer above either an Nwell or a Pwell in order to achieve different types of NFETs or PFETs with different VTs. For example, for a super low threshold voltage (SLVT) or low threshold voltage (LVT) FET, an NFET can be formed above an Nwell and a PFET can be formed above a Pwell. For a regular threshold voltage (RVT) or high threshold voltage (HVT) FET, an NFET can be formed above a Pwell and a PFET can be formed above an Nwell. Typically, a circuit block will include all SLVT (or LVT) FETs with NFETs above Nwells and PFETs above Pwells or all RVT (or HVT) FETs with NFETs above Pwells and PFETs above Nwells. Whether the FETs are SLVT or LVT FETs or whether they are RVT or HVT FETs will depend upon the design (e.g., device size, etc.) and process specifications (e.g., dopant concentrations, etc.). The NFETs 151-152 can be configured as an SLVT NFET and an LVT NFET, respectively; whereas the PFETs 153-154 can be configured as an RVT PFET and an HVT PFET, respectively.

Another advantage of fully depleted semiconductor-on-insulator (e.g., FDSOI) technology processing platforms is that back gate biasing (referred to as back-biasing) can be employed to fine tune FET VTs. Forward back-biasing (FBB) refers to applying a gate bias voltage to the back gate (particularly, to the well region thereof) to reduce the VT of the FET. Generally, for a PFET, FBB is achieved by applying zero volts (i.e., grounding) or a negative gate bias voltage to the well region; whereas, for an NFET, FBB is achieved by applying a positive gate bias to the well region. Reverse back-biasing (RBB) refers specifically to applying a gate bias voltage to the back gate (particularly, to the well region thereof) to increase the VT of the FET, thereby decreasing the switching speed and reducing leakage current. Generally, for a PFET, RBB is achieved by applying a positive back bias voltage (+Vbg) to the well region; whereas, for an NFET, RBB is achieved by applying a negative back bias voltage (−Vbg) to the well region.

More specifically, with the above-described configuration, each transistor 151-154 effectively has a corresponding secondary gate (also referred to herein as a back gate (BG)) adjacent to the active device region opposite the primary gate. The secondary gate includes adjacent portions of the insulator layer 202 and Nwell 150 below. The structure 200 can further include at least one N-type contact region 155 (also referred to herein as an Ntap) immediately adjacent to the Nwell 150. That is, structure 200 can further include a bulk region (also referred to as a hybrid region). This bulk region can be devoid of the insulator layer 202 and instead can include one or more Ntaps 155 on the semiconductor substrate 201 immediately adjacent to Nwell 150 and electrically isolated from the active device regions of the transistors (e.g., by isolation regions 205). Each Ntap 155 can include, for example, an epitaxially grown monocrystalline semiconductor layer (e.g., an epitaxially grown silicon layer or an epitaxially grown layer of any other suitable semiconductor material) on the top surface of semiconductor substrate 201 immediately adjacent to Nwell 150. The epitaxially grown semiconductor layer can further be in situ doped or subsequently implanted so as to have N-type conductivity (e.g., at a higher conductivity level than the Nwell 150). Optionally, each Ntap 155 can further include a silicide layer thereon (not shown).

Ntap(s) 155 can be electrically connected to receive a specific bias voltage from a variable bias voltage generator (not shown). The variable bias voltage generator can be in communication with controller 190 and, in response to control signals from controller 190, can output a specific bias voltage (Vb) selected from a range of selectable bias voltages to the Ntap(s) 155. Variable bias voltage generators are well known in the art and, thus, the details thereof have been omitted from this specification in order to allow the reader to focus on the salient aspects of the disclosed embodiments.

Transistors 151-154 can, for example, be rated as 1.8V transistors. In this case, Vb can be selectable from a range of possible bias voltages between 0.0V to 1.75V. A Vb of 0.0V zero back biases all transistors 151-154. A positive Vb (+Vb) would result in FBB of the NFETs 151-152 and RBB of the PFETs 153-154.

Figure 3:
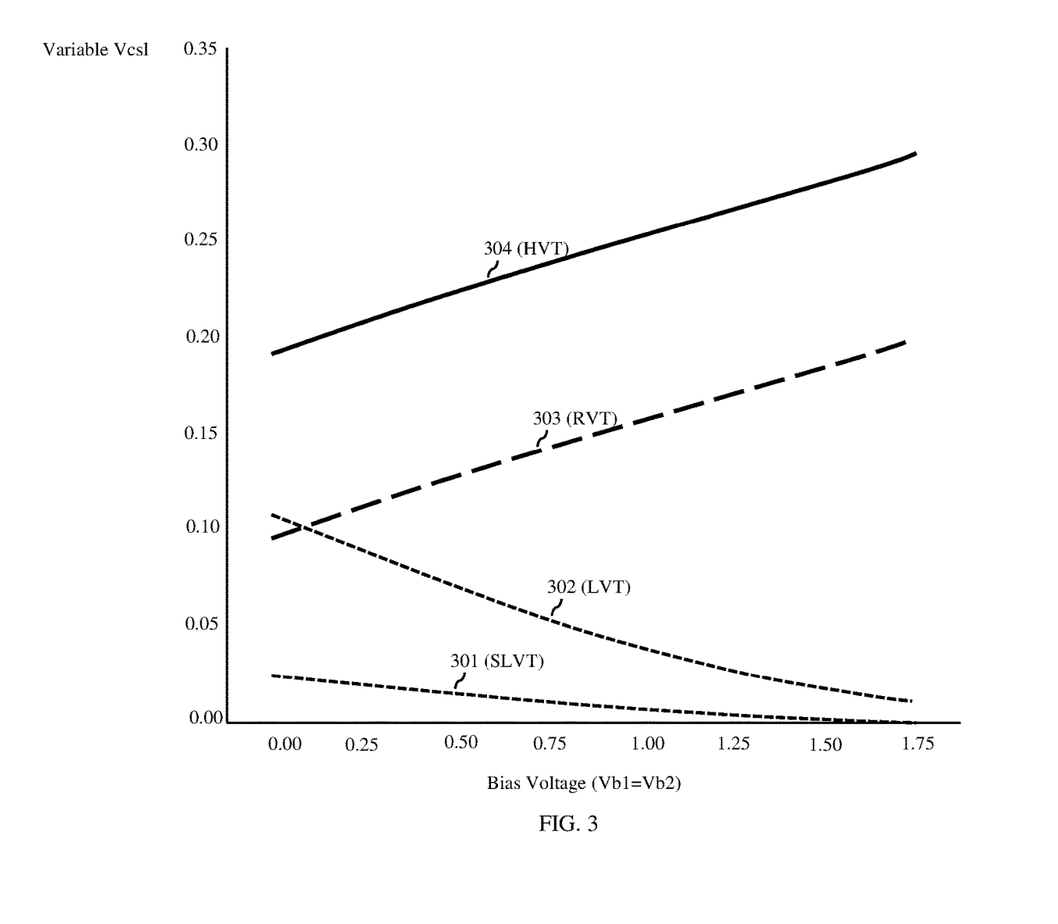
FIGS. 3 and 4 are a graph and table, respectively, illustrating examples of variations in a low cell supply voltage (Vcsl) that can be achieve using the programming circuit of the memory structure.
Figure 4:
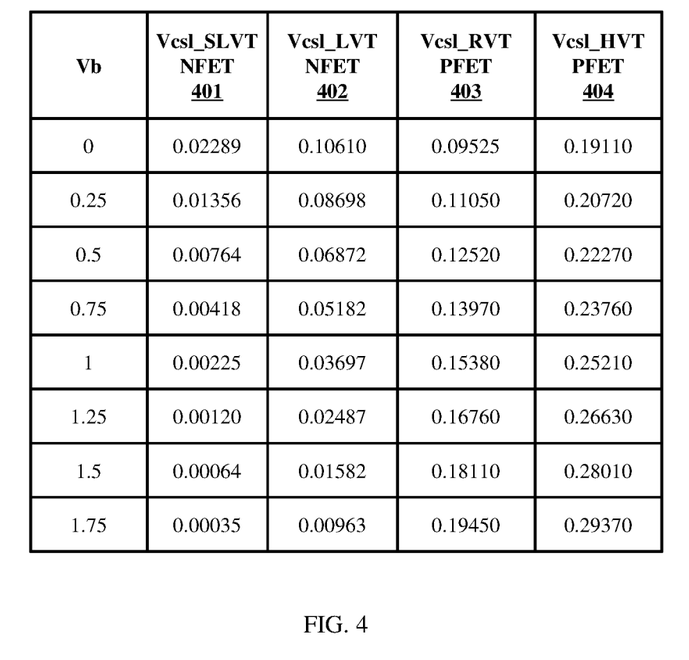

As mentioned above, in the disclosed embodiments, the programming of Vcsl can be performed during the retention mode to achieve some maximum desired difference between Vcsl and Vcsh. Specifically, Vcsl during the retention mode can be programmed so that the maximum difference between Vcsl and Vcsh is sufficient (i.e., large enough) to ensure that memory cells 101 retain data stored therein but smaller than the difference between Vcsl and Vcsh during the operational mode in order to reduce leakage current and, more particularly, to prevent leakage current during the retention mode over some predetermined amount. Consider an example where the maximum desired leakage current during the retention mode (i.e., the total retention current for a number of columns) is 500 picoAmps (pA). FIGS. 3 and 4 are a graph and table, respectively, illustrating examples of variations in Vcsl that can be achieved for a maximum leakage of 500 pA as a function of which of the four transistors 151-154 is connected by a corresponding one of switches 171-174 to first cell supply voltage line 142 and also as a function of variations in Vb between 0.0V and 1.75V (e.g., see curves 301-304 in FIG. 3 and columns 401-404 in FIG. 4). As illustrated, Vcsl is lowest (e.g., approximately 20 mV) when Vb is at 0.0V and first transistor 151 is connected to first cell supply voltage line 142 (e.g., see curve 301 of FIG. 3 and column 401 of FIG. 4 for SLVT NFET). Vcsl is highest (e.g., approximately 0.3V) when Vb is at 1.75V and fourth transistor 154 is connected to first cell supply voltage line 142 (e.g., see curve 304 of FIG. 3 and column 404 of FIG. 4 for HVT PFET). It should be understood that the above described example is provided for illustration purposes and is not intended to be limiting. The transistor ratings, maximum desired leakage, etc. can vary as a function of the technology node, performance specifications, et.

As illustrated in FIG. 1A, switches 171-174 and additional switch 179 of programming circuit 140 can all be NFET switches and can be on the insulator layer aligned above an additional well region 170 in the semiconductor substrate. The additional well region 170 can be electrically isolated from well region 150 and can be either a P-type well region (Pwell) or an Nwell. Additional well region 170 can have one or more contact region(s) 175 thereon (e.g., Ptap(s) or Ntap(s), as appropriate). Contact region(s) 175 can, for example, be electrically connected to ground such that the NFET switches (i.e., switches 171-174 and additional switch 179) are zero back biased in both the operational and retention modes.

Memory structure 100 described above and illustrated in FIG. 1A is provided for illustration purposes and is not intended to be limiting. Alternative memory structure embodiments can include, for example, additional Vcsl programming options, different types of switches, additional well regions and taps thereto to facilitate additional back biasing options, etc.

Figure 5:
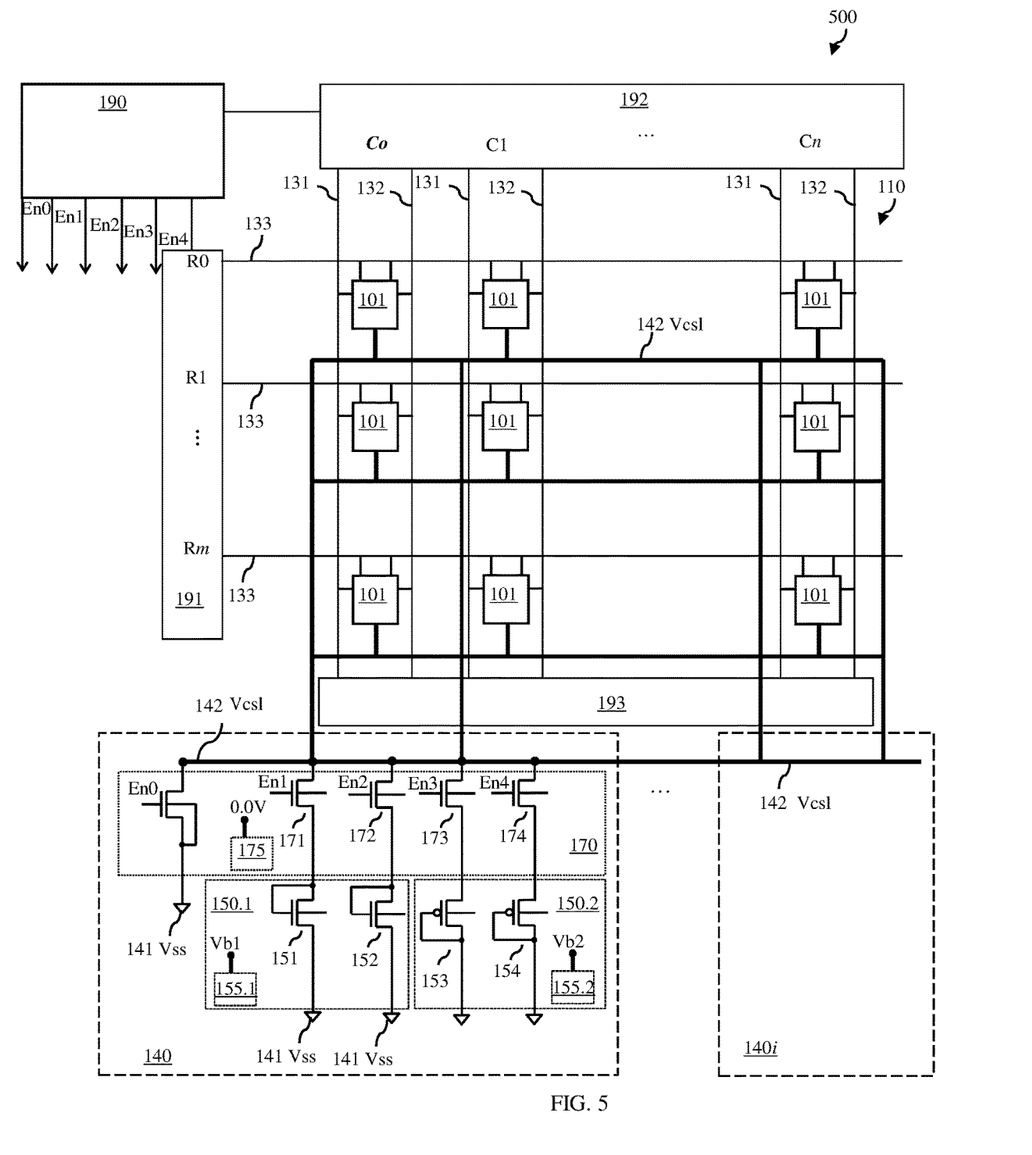
FIG. 5 is a schematic diagram illustrating other disclosed memory structure embodiments.
Figure 6:
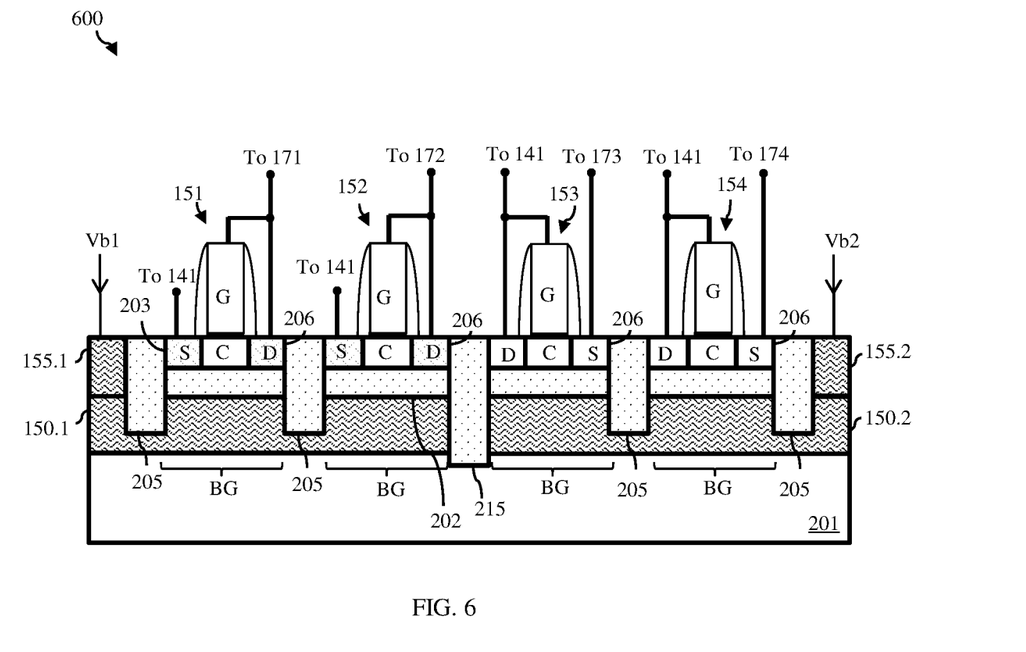
FIG. 6 is a cross-section diagram illustrating a portion of a semiconductor-on-insulator structure including examples of transistors with different threshold voltages that can be incorporated into the programming circuit of the structure of FIG. 5.

In some alternative memory structure embodiments, fine-tuned Vcsl programming options can be achieved by enabling selective back biasing of individual ones or groups of the transistors 151-154. For example, FIG. 5 is a schematic diagram illustrating an embodiment of a memory structure 500. Memory structure 500 can be configured similar to memory structure 100, as described above, except that in programming circuit 140 of memory structure 500 the NFETs 151-152 and PFETs 153-154 can be back biased with different bias voltages (Vb1) and (Vb2), respectively (instead of being back biased by the same Vb). Vb1 and Vb2 can be different positive back bias voltages so that NFETs 151-152 are FBB and PFETs 153-154 are RBB. FIG. 6 shows a cross-section diagram of a portion of a fully depleted semiconductor-on-insulator structure 600. Structure 600 can be configured similar to structure 200, as described above, except that it includes multiple well regions 150.1 and 150.2 as opposed to a single well region. For example, structure 600 includes transistors 151-154 (i.e., NFETs 151 and 152 and PFETs 153 and 154) of programming circuit 140 in memory structure 500, but within structure 600 an Nwell 150.1 is aligned below NFETs 151-152 and an Nwell 150.2 is aligned below PFETs 153-154. Nwells 150.1 and 150.2 can be electrically isolated from each other (e.g., by a deep trench isolation (DTI) region 215, as illustrated, or alternatively, by a Pwell (not shown)). Nwells 150.1 and 150.2 can have corresponding Ntaps 155.1-155.2 thereon and Ntaps 155.1 and 155.2 can be electrically connected to receive corresponding bias voltages Vb1 and Vb2. Vb1 and Vb2 can, for example, each be selected from a range of different bias voltages provided by the same variable bias voltage generator or by different bias voltage generators. Similarly, in alternative memory structure embodiments (not shown), transistors 151-154 can be on the insulator layer aligned above four different well regions, respectively, in the semiconductor substrate. In this case, the four different well regions can have corresponding taps connected to receive four different bias voltages, respectively.

Figure 7:
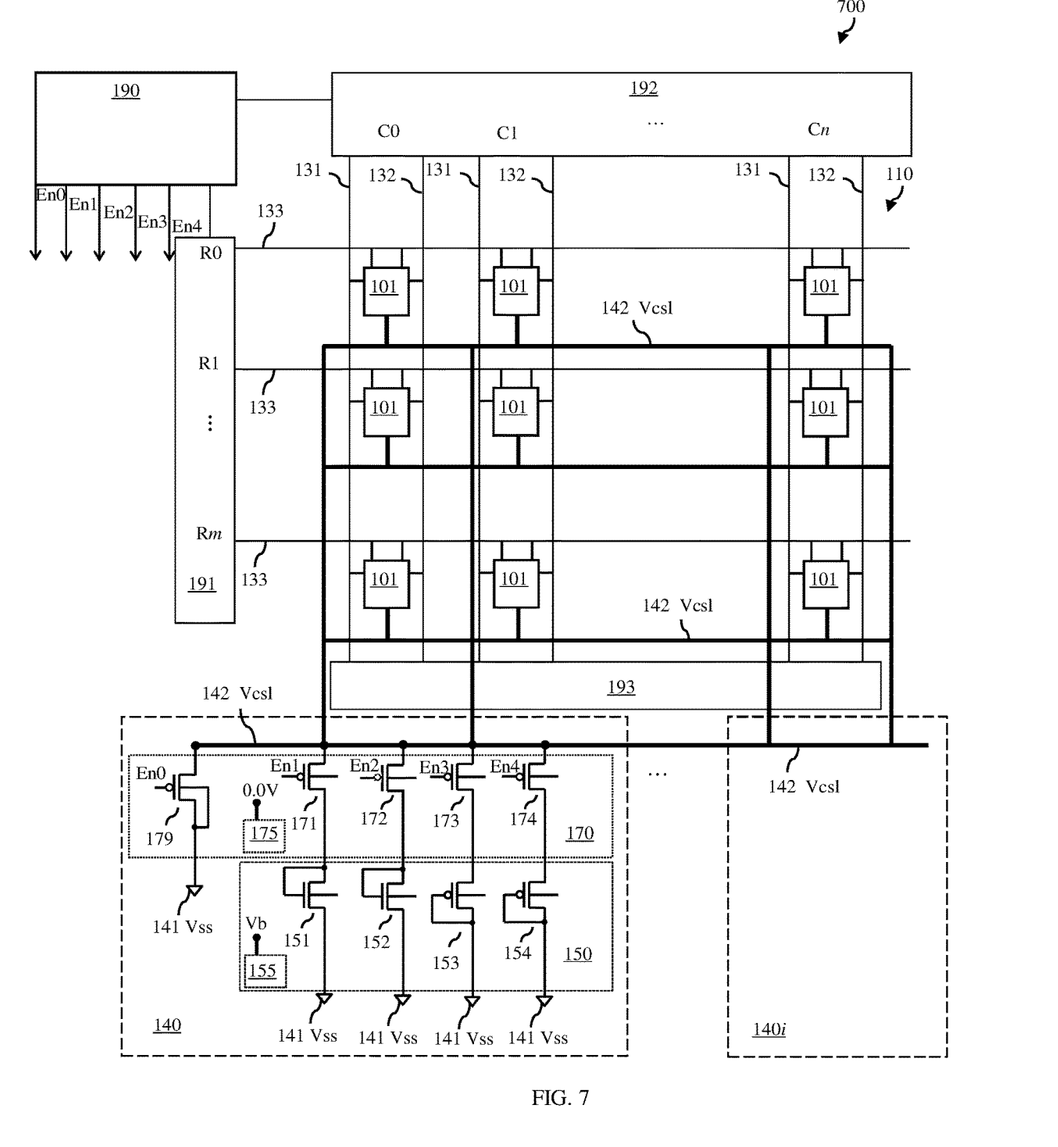
FIG. 7 is a schematic diagram illustrating still other disclosed memory structure embodiments.

In some alternative memory structure embodiments, switches 171-174 and additional switch 179 could all be PFET switches. FIG. 7 is a schematic diagram illustrating an alternative embodiment of a memory structure 700. Memory structure 700 can be configured similar to memory structure 100 (as illustrated) or similar to memory structure 500 except that switches 171-174 and additional switch 179 of programming circuit 140 are all PFET switches instead of NFET switches. Specifically, in memory structure 700, each switch 171-174 can be a PFET switch and can have a drain region connected to a transistor 151-154, a source region connected to the first cell supply voltage line 142, and a gate connected to receive an enable signals En1-En4 that controls the on/off state of the PFET switch. It should be understood that the enable signals used for PFET switches will have opposite polarity from that used for NFET switches. Thus, for a given transistor-PFET switch pair, when the corresponding enable signal (e.g., En1-En4) controlling the PFET switch is low, that PFET switch will be conductive electrically connecting the transistor to first cell supply voltage line 142 and, when the corresponding enable signal is high, the PFET switch will be non-conductive. As with the previously described embodiment, Vcsl on first cell supply voltage line 142 will vary at least as a function of which one of transistors 151-154 (which have different VTs) is electrically connected to first cell supply voltage line 142. Additional switch 179 can also be a PFET switch and can have a drain region connected to ground (Vss) 141, a source region connected to first cell supply voltage line 142, and a gate controllable by a mode control signal (En0). When En0 is low, this additional PFET switch will be conductive, whereas, when En0 is high, it will be non-conductive.

During the operational mode (e.g., during read or write operations), controller 190 can output switch enable signals (En1-En4) and mode control signal (En0) such that, within programming circuit 140, switches 171-174 remain off and additional switch 179 turns on to discharge Vcsl to ground. During the retention mode, controller 190 can output switch enable signals (En1-En4) and mode control signal (En0) such that, within programming circuit 140, additional switch 179 is off and only a particular one of switches 171-174 turns on so the maximum desired difference between Vcsl and Vcsh can be achieved (e.g., to retain stored data while also minimizing leakage current to some predetermined amount).

As in memory structure 100 of FIG. 1A, in memory structure 700 of FIG. 7, switches 171-174 and additional switch 179 are on an insulator layer aligned above the same additional well region 170 in the semiconductor substrate. Additional well region 170 can be electrically isolated from well region 150 and can be either a P-type well region (Pwell) or an Nwell. Additional well region 170 can have one or more contact region(s) 175 thereon (e.g., Ptap(s) or Ntap(s), as appropriate). Contact region(s) 175 can, for example, be electrically connected to ground such that switches 171-174 and additional switch 179 are zero back biased in both the operational and retention modes.

In alternative memory structure embodiments (not shown), switches 171-174 and additional switch 179 of programming circuit 140 could be on the insulator layer above the same additional well region 170; however, switches 171-174 could have a different type conductivity than additional switch 179 (as opposed to switches 171-174 and additional switch 179 all being NFET switches, as shown in FIG. 1A, or all being PFET switches, as shown in FIG. 7). For example, in some embodiments, switches 171-174 can be PFET switches and additional switch 179 can be an NFET switch. In this case, during an operational mode, a positive back bias voltage (+Vbg) can be applied to the well region 170 to FBB the NFET switch and RBB the PFET switches. During a retention mode, a negative back bias voltage (−Vbg) can be applied to the additional well region 170 to RBB the NFET switch and FBB the PFET switches. In some embodiments, switches 171-174 can be NFET switches and additional switch 179 can be a PFET switch. In this case, during an operational mode, a negative back bias voltage (−Vbg) can be applied to additional well region 170 to FBB the PFET switch and RBB the NFET switches. During a retention mode, a positive back bias voltage (+Vbg) can be applied to additional well region 170 to RBB the PFET switch and FBB the NFET switches.

In still other alternative memory structure embodiments (not shown), switches 171-174 and additional switch 179 of programming circuit 140 can all have the same type conductivity (e.g., can all be NFET switches as shown in FIG. 1A or can all be PFET switches as shown in FIG. 7); however, switches 171-174 and additional switch 179 can be on the insulator layer aligned above two different additional well regions, respectively, in the semiconductor substrate (as opposed to all switches being aligned above the same additional well region as in the examples above). In this case, the two different additional well regions can be isolated from each other and can have taps thereon electrically connected to receive different bias voltages. During the operational mode, switches 171-174 can be RBB and additional switch 179 can be FBB by different bias voltages; whereas, during the retention mode, switches 171-174 can be FBB and additional switch 179 can be RBB by different bias voltages.

All of the disclosed memory structures embodiments (e.g., memory structure 100 of FIG. 1A, memory structure 500 of FIG. 5, memory structure 700 of FIG. 7, or any of the other alternative memory structure embodiments) can include a single programming circuit 140. However, it should be understood that, optionally, such memory structures could include multiple instances of programming circuit 140, which are essentially identical, connected to different portions of the first cell supply voltage line 142. Those skilled in the art will recognize that additional instances of programming circuit 140 (e.g., some predetermined number (i) of instances) may be required, depending upon the overall size of first cell supply voltage line 142, to adjust the voltage level in each of the different portions so that the desired Vcsl is maintained at essentially the same programmed level (e.g., plus or minus 10%) across the entire first cell supply voltage line 142. In this case, each instance of programming circuit 140 will receive the same control signals from controller 190 and the transistors 151-154 therein will be subjected to the same back biasing in each instance.

Fully depleted semiconductor-on-insulator structures (e.g., FDSOI structures) that include both semiconductor-on-insulator regions with semiconductor-on-insulator NFETs and/or PFETs and bulk regions with well taps to in-substrate Pwells and/or Nwells below the FETs are well known in the art and can have various configurations. Thus, the details thereof and the processing techniques (e.g., conventional FDSOI processing techniques) have been omitted from the specification and drawings in order to allow the reader to focus on the salient aspects of the disclosed embodiments (e.g., related to programming circuit 140 and further related to control of programming circuit 140 during operational and retention modes to program Vcsl, as discussed above).

It should be understood that in the structures and method described above a semiconductor material refers to a material whose conducting properties can be altered by doping with an impurity. Such semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region. Furthermore, when a semiconductor region or layer is described as being at a higher conductivity level than another semiconductor region or layer, it is more conductive (less resistive) than the other semiconductor region or layer; whereas, when a semiconductor region or layer is described as being at a lower conductivity level than another semiconductor region or layer, it is less conductive (more resistive) than that other semiconductor region or layer.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a," "an," and "the" are intended to include the plural forms as well, unless the context clearly indicates otherwise. Additionally, as used herein, the terms "comprises," "comprising," "includes," and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   an array of memory cells;
   a first cell supply voltage line connected to the memory cells and at a first cell supply voltage, wherein the first cell supply voltage is programmable; and
   a programming circuit connected to the first cell supply voltage line and including:
      switches; and
      transistors connected to ground and further connectable by the switches, respectively, to the first cell supply voltage line, wherein the transistors have different threshold voltages, and wherein the transistors include:
         a first transistor with a first threshold voltage;
         a second transistor with a second threshold voltage higher than the first threshold voltage, wherein the first transistor and the second transistor include N-channel field effect transistors;
         a third transistor with a third threshold voltage; and
         a fourth transistor with a fourth threshold voltage higher than the third threshold voltage, wherein the third transistor and the fourth transistor include P-channel field effect transistors.

2. The structure of claim 1, wherein the memory cells include static random access memory cells.

3. The structure of claim 1, further comprising a second cell supply voltage line connected to the memory cells and at a second cell supply voltage higher than the first cell supply voltage.

4. The structure of claim 1, wherein the transistors are on an insulator layer above a well region in a semiconductor substrate, and wherein the well region is connected to receive a bias voltage.

5. The structure of claim 4, further comprising a controller outputting corresponding enable signals to the switches, wherein, in a retention mode, one of the corresponding enable signals causes one of the switches to electrically connect one of the transistors to the first cell supply voltage line to program the first cell supply voltage, and wherein the controller further causes a specific bias voltage to be received by the well region to further tune the first cell supply voltage.

6. The structure of claim 5,
   wherein the programming circuit further includes an additional switch,
   wherein the controller outputs an additional enable signal to the additional switch, and
   wherein, in an operational mode, the additional enable signal causes the additional switch to electrically connect the first cell supply voltage line to ground.

7. The structure of claim 6, wherein the switches and the additional switch comprise N-channel field effect transistors.

8. The structure of claim 6, wherein the switches and the additional switch comprise P-channel field effect transistors.

9. The structure of claim 1, further comprising multiple instances of the programming circuit connected to different portions of the first cell supply voltage line.

10. A structure comprising:
    an array of memory cells;
    a first cell supply voltage line connected to the memory cells and at a first cell supply voltage, wherein the first cell supply voltage is programmable; and
    a programming circuit connected to the first cell supply volage line and including:
       switches; and
       transistors connected to ground and further connectable by the switches, respectively, to the first cell supply voltage line, wherein the transistors are on an insulator layer above a well region in a semiconductor substrate and have different threshold voltages, wherein the well region is connected to receive a bias voltage, and wherein the transistors include:
          a first transistor with a first threshold voltage;
          a second transistor with a second threshold voltage higher than the first threshold voltage, wherein the first transistor and the second transistor include N-channel field effect transistors;
          a third transistor with a third threshold voltage; and
          a fourth transistor with a fourth threshold voltage higher than the third threshold voltage, wherein the third transistor and the fourth transistor include P-channel field effect transistors.

11. The structure of claim 10, wherein the memory cells include static random access memory cells.

12. The structure of claim 10, further comprising a second cell supply voltage line connected to the memory cells and at a second cell supply voltage higher than the first cell supply voltage.

13. The structure of claim 11, further comprising a controller outputting corresponding enable signals to the switches, wherein, in a retention mode, one of the corresponding enable signals causes one of the switches to electrically connect one of the transistors to the first cell supply voltage line to program the first cell supply voltage, and wherein the controller further causes a specific bias voltage to be received by the well region to further tune the first cell supply voltage.

14. The structure of claim 13,
    wherein the programming circuit further includes an additional switch,
    wherein the controller outputs an additional enable signal to the additional switch, and
    wherein, in an operational mode, the additional enable signal causes the additional switch to electrically connect the first cell supply voltage line to ground.

15. The structure of claim 14, wherein the switches and the additional switch comprise N-channel field effect transistors.

16. The structure of claim 14, wherein the switches and the additional switch comprise P-channel field effect transistors.

17. The structure of claim 10, further comprising multiple instances of the programming circuit connected to different portions of the first cell supply voltage line.

18. A structure comprising:
  an array of memory cells;
  a first cell supply voltage line connected to the memory cells and at a first cell supply voltage, wherein the first cell supply voltage is programmable; and
  a programming circuit connected to the first cell supply voltage line and including:
    switches; and
    transistors connected to ground and further connectable by switches, respectively, to the first cell supply voltage line, and
    wherein the transistors have different threshold voltages and include:
      a first transistor with a first threshold voltage;
      a second transistor with a second threshold voltage higher than the first threshold voltage, wherein the first transistor and the second transistor are two N-channel field effect transistors on an insulator layer above a first Nwell in a semiconductor substrate, and wherein the first Nwell is connected to receive a first bias voltage;
      a third transistor with a third threshold voltage; and
      a fourth transistor with a fourth threshold voltage higher than the third threshold voltage, wherein the third transistor and the fourth transistor are two P-channel field effect transistors on the insulator layer above a second Nwell in the semiconductor substrate, and wherein the second Nwell is isolated from the first Nwell and connected to receive a second bias voltage.

* * * * *